United States Patent
Hlywka et al.

[19]

[11] Patent Number: 5,961,143

[45] Date of Patent: Oct. 5, 1999

[54] MOTOR VEHICLE AIR BAG COVER HAVING A SKIN WITH PERFORATED SCORE LINE AND A METHOD FOR MANUFACTURE THEREOF

[75] Inventors: Robert W. Hlywka, Cobourg; Cameron J. Potts, Port Hope; Peter F. Czulo, Brighton; Robert C. Cooper, Oshawa, all of Canada

[73] Assignee: Textron Automotive Company, Dover, N.H.

[21] Appl. No.: 09/075,439

[22] Filed: May 11, 1998

[51] Int. Cl.⁶ ...................................................... B60R 21/16
[52] U.S. Cl. ........................................ 280/728.3; 280/732
[58] Field of Search ................................ 280/728.3, 731, 280/732

[56] References Cited

U.S. PATENT DOCUMENTS

| | | | |
|---|---|---|---|
| 5,335,935 | 8/1994 | Proos et al. | 280/728.3 |
| 5,524,923 | 6/1996 | Henseler | 280/728.3 |
| 5,772,240 | 6/1998 | Vavalidis | 280/728.3 |
| 5,863,064 | 1/1999 | Rheinlander et al. | 280/732 |

*Primary Examiner*—Kenneth R. Rice
*Attorney, Agent, or Firm*—Reising, Ethington, Barnes Kisselle, Learman & McCulloch, P.C.

[57] ABSTRACT

A cover for covering an air bag in a motor vehicle has a thin elastic plastic skin, a rigid substrate and an intermediate layer of soft plastic foam. The skin has a tear seam and the substrate includes a door that is impacted by the inflating air bag and presses outward against the foam layer and the skin to tear the foam layer and the tear seam and then swing outward with a torn section of the foam layer and skin to form an opening in the cover for deployment of the air bag into the passenger space in the vehicle. The tear seam in the skin has a score line formed by partial perforations defined by tapered holes that are evenly spaced and formed at a controlled depth on the underside of the skin by a lasing method.

24 Claims, 2 Drawing Sheets

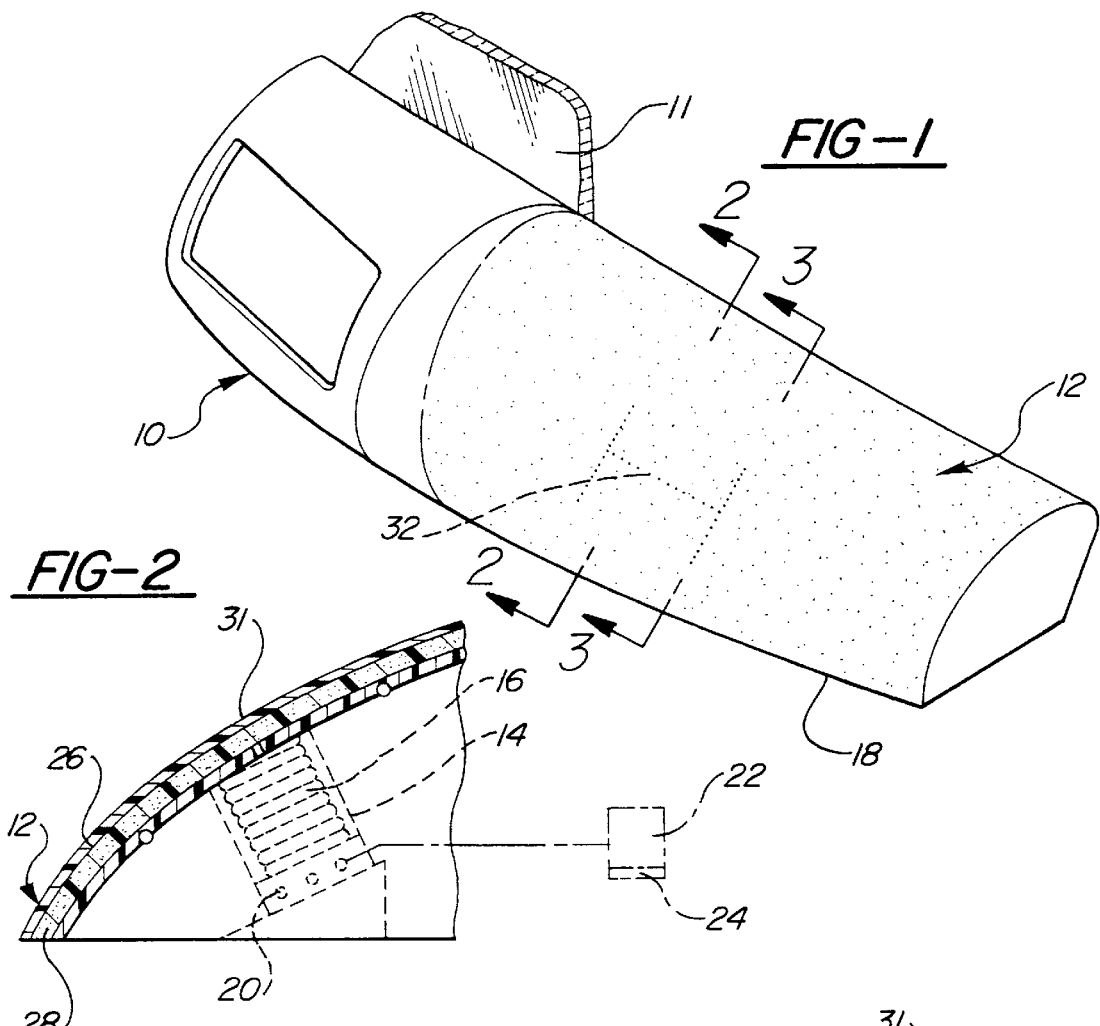
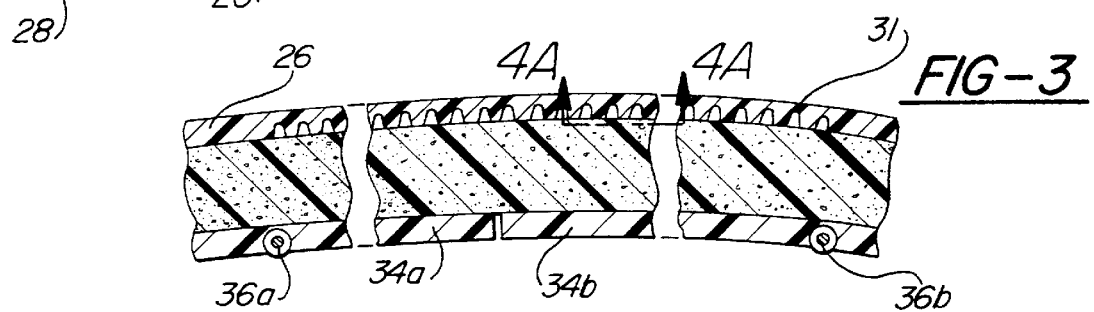
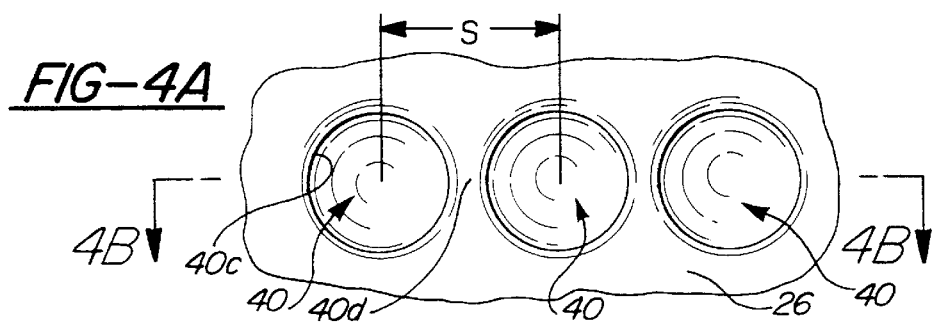

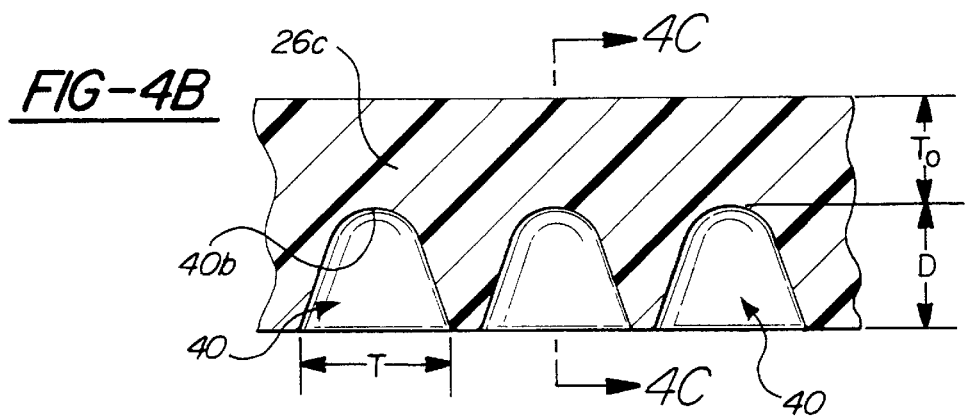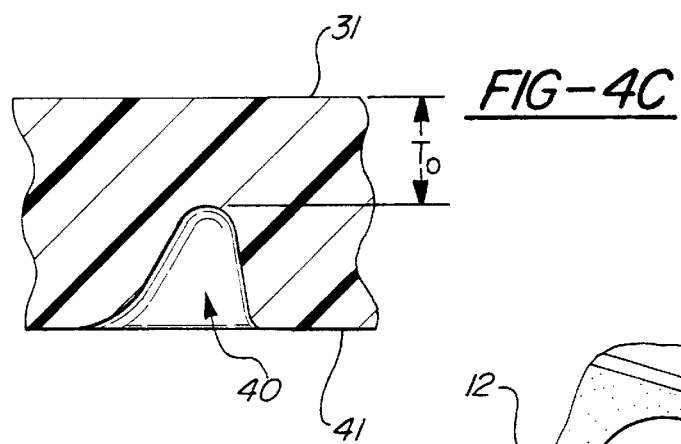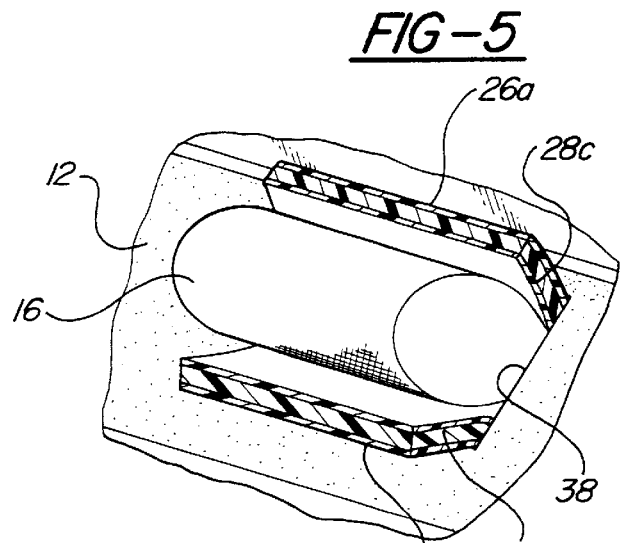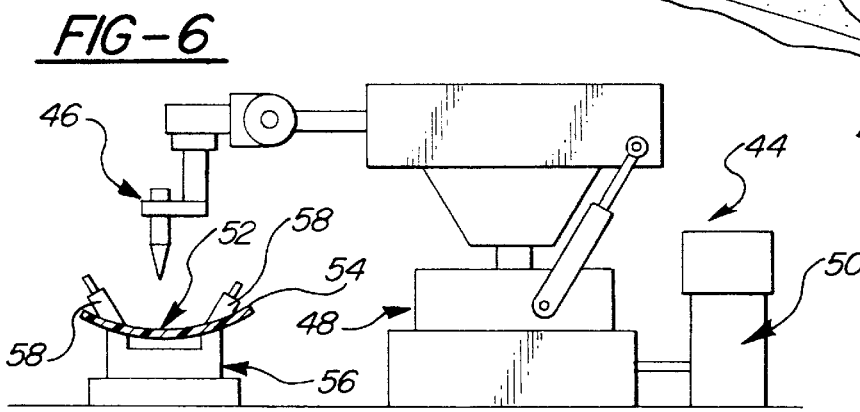

MOTOR VEHICLE AIR BAG COVER HAVING A SKIN WITH PERFORATED SCORE LINE AND A METHOD FOR MANUFACTURE THEREOF

TECHNICAL FIELD

This invention relates to motor vehicle air bag covers and more particularly to a method to form an invisible tear seam in the skin of an air bag cover that tears from the force of air bag inflation to form an opening in the skin for deployment of the air bag and further is related to a resultant tear seam product having controlled depth, evenly spaced tapered holes.

BACKGROUND OF THE INVENTION

A common type of interior decorative trim panel or cover used to cover and hide the air bag in a motor vehicle comprises a thin elastic plastic skin having a non-glaring grained outer surface, a rigid retainer or substrate and an intermediate layer of soft plastic foam between the skin and substrate in some cases the foam is omitted. The present invention relates to those covers wherein the skin is formed of a thermoplastic polymer or thermosetting resin and is provided with an invisible tear seam, and the substrate includes one or more doors that are impacted by the inflating air bag and press against the cover to separate the tear seam and then swing outward to form an opening in the cover for deployment of the air bag into a protective position in the passenger space. These tear seams are provided in various configurations or patterns with the most common having a C, H, U, or X-shape and wherein the pattern determines the number of doors required in the substrate, It is desirable that the tear seams and thereby the presence of the air bag be hidden from view for various reasons and heretofore, this has been accomplished in several different ways. Such a tear seam is commonly referred to as an "invisible tear seam". One way of providing such an invisible tear seam is by forming a tear seam defining groove or series of depressions in the backside of the skin. This leaves a thin and thereby weakened section at the outer or appearance side of the skin that defines the tear seam without outwardly revealing its presence during normal view by an ordinary vehicle occupant. Examples of such invisible air bag cover tear seams are disclosed in U.S. Pat. Nos. 5,072,967; 5,082,310; 5,316,822, 5,348,339 and 5,632,914. The tear seam may be formed in the backside of the skin in various ways as is well known by those skilled in the art.

While suitable for their intended purposes each of the proposals for weakening the seam require precise and/or multiple processing sequences that can add to the cost of manufacture of the air bag cover. Further, it has been found that under certain conditions, the location of an invisible tear seam on the backside of the skin may "read through " and be detectable on the frontside of the skin.

In the case of laser scoring, U.S. Pat. No. 5,632,914 patent assigned to the owner of the present invention, discloses an arrangement that requires a precision adjustment of very small holes that completely penetrate a shell. While the arrangement is undetectable by normal viewing, it represents an interruption in the surface of the shell or skin cover of the air bag. Furthermore, the very small nature of the holes combined with a high quantity to facilitate adequate weakening results in an increase in equipment precision and cycle time, with both attributes resulting in increased manufacturing costs.

SUMMARY OF THE INVENTION

The method and resultant tear seam product present invention is a sigificant improvement over the above methods of forming a tear seam in a thin elastic thermoplastic or thermosetting plastic skin for an air bag cover and, in particular, offers cost effective reduced cost laser manufacturing flexibility in that various prescribed tear seam patterns that do not read through the shell or skill can be formed in repetitive fashion, wherein the same laser settings can be employed at each of a plurality of evenly spaced holes to form a partially perforated hole pattern wherein each of the holes has the same throat diameter, same spacing and a controlled depth of uniform dimension, all defining a tear seam of partial perforations defined by spaced holes having the same throat diameter and controlled depth taper on the inside surface of a shell or skin that do not read through the shell or skin and that will retain the same tear characteristics of a V-groove type laser cut out that partially cuts through the shell or skin either continuously or with spaced segments.

The method is accomplished in the present invention by using a laser mounted on a robot or on a multi-axis feed system and a controller for the laser and the feed system that will operate to form a plurality of evenly spaced holes on the inside surface of a skin or shell covering for an air bag deployment system, and wherein each of the holes has a controlled depth that is formed by pulsing the laser on and off at the same rate or substantially same rate, and simultaneously advancing the feed system at a speed that is synchronized with the pulse rate such that each hole is precisely shaped and spaced to form a partially perforated hole pattern of evenly spaced partial perforations formed as holes having the same throat diameter and a controlled depth taper so as not to read through the shell or skin and that will retain the same tear characteristics of a V-groove type laser cut out that partially cuts through the shell or skin.

The tear seam is thus formed as series of partial perforations having each hole formed by a laser pulse rate that is substantially constant and wherein the spacing between each of the partial perforations is determined by the speed of feed of the part with respect to the laser so that the same number of laser pulses occurs at each hole on the fly so as to produce an array or matrix of laser machined holes of precise depth having a hole size dimension in the backside of a shell or skin that is no greater than about 0.035 inches in throat diameter and 0.020 inches in depth and with a spacing of 0.030 inches on center. It has been found that such hole sizes in the inner surface prevent read through on the visible surface of the instrument panel or air bag cover on a steering column and still weaken the skin sufficiently to facilitate proper tearing during airbag deployment. Such dimensions are representative and have been found suitable in a skin or cover of TPU (thermoplastic urethane) materials such as those disclosed in pending U.S. application Ser. No 08/319,614 hereby incorporated by reference.

The thin skin or shell commonly has a nominal thickness of about 0.040 inches and the representative laser formed holes are fully within the capability of an $CO_2$ laser. Furthermore, the laser provides the capability of forming the holes in various geometrical shapes including round, oval, square, diamond shaped, and elliptical.

The precise depth and spaced laser holes are provided in their tear seam defining array or matrix with a density or spacing depending on their hole size that reduces the effective cross section of the skin along and across the tear seam and thereby the tensile strength of the skin at the tear seam by not more than about 50 percent which has been found to adequately maintain the structural integrity of the skin while sufficiently weakening same at the tear seam so that the latter will assuredly shear or tear from the typical force of air bag inflation. The holes may be arranged in the prescribed tear seam pattern in a single row to define the desired tear seam or they may be arranged in several parallel rows or in a random arrangement as an array or matrix of holes and wherein the larger the number of holes for a given tear seam pattern, the smaller the holes may be to produce the desired weakening.

In performing the laser machining of the tear seam holes, the air bag cover skin is firmly clamped in place in a fixture and a computer controlled $CO_2$ laser and a similarly controlled robot on which it is mounted are operated with program control so that the laser very precisely tracks the desired tear seam pattern on the skin at a prescribed distance therefrom and rapidly machines the required size and number of holes one after the other with the desired spacing. The tear seam hole pattern including its configuration, the size and shape of the holes, the spacing of the holes, and the number of holes is predetermined and the laser and robot controller is programmed accordingly and thus various tear seam hole patterns can be machined in similar and different skins at a single laser machining work cell. The holes are laser machined from the inside or the backside of the skin or shell with the latter accomplished prior to the formation of the foam layer thereagainst (if a foam layer is employed) as in the case of back foamed instrument panel units that define the cover of the air bag deployment system. The foam may or may not fill the holes, depending on the flow and cure characteristics of the foam. Alternatively, it may be desirable to laser machine partial hole perforations after formation of the foam layer in which case the pattern of holes in the foam layer will substantially duplicate the size, shape, and spacing of the holes in the skin or shell.

If desired, several such robot mounted lasers or fixed lasers may be used in a single work cell to simultaneously machine certain sections of the tear seam to shorten the machining time.

It is therefore an object of the present invention to provide a new and improved tear seam in the skin of a motor vehicle air bag cover that is formed as a series of partial hole perforations that do not read through the skin or shell of the air bag cover.

Another object of the present invention is to form a tear seam in the skin of a motor vehicle air bag cover with a series of partial hole perforations that have a hole size dimension not greater than about 0.035 inches throat diameter and 0.020 inches depth and 0.030 inches center spacing on the inside of the skin or shell so as to be invisible to a person of normal vision when viewed at and within a normal viewing distance in the vehicle (i.e. no read through).

Another object of the present invention is to provide a skin for a motor vehicle air bag cover having a tear seam formed with laser machined holes in the inside of the skin that have a precise depth at each hole to define an easily separable weakened seam in an air bag cover without penetrating or reading through the outer side or outside surface of the cover.

Another object of the present invention is to provide a skin or shell for an air bag cover having an invisible tear seam formed by precisely formed partial perforations defined as laser machined holes that are machined from the backside of the skin so as to have a bottom surface arranged closely adjacent the outer side of the skin but at a controlled depth that will prevent read though of the holes at the outer side of the skin.

Another object of the present invention is to provide a flexible method of manufacturing an invisible tear seam in the skin of a motor vehicle air bag cover by forming the tear seam with partial perforations defined by laser machined holes according to a tear seam pattern that can be readily varied by controlling the size and/or placement of the holes adjacent one another.

Another object of the present invention is to form an invisible tear seam in the skin of a motor vehicle air bag cover is formed by laser machining an array or matrix of partially perforated, spaced holes in the skin according to a prescribed tear seam pattern by the same number of laser pulses at each hole while the laser is relatively moved with respect to the skin.

Still another object of the present invention is to provide a laser formed hole pattern on the inner or backside surface of a skin or shell that does not represent too much mechanical weakening of the skin or shell so as to cause read through in the skin or shell.

Yet another object of the present invention is to provide a skin or shell covering in an air bag cover assembly that has a hidden seam therein formed by a pattern of partial perforations defined by tapered holes that are uniformly spaced and formed to a uniform depth in only the underside of the shell or skin and wherein the uniform spacing and the depth of the holes is selected to prevent read through while retaining desired programmed release of the cover when an air bag is deployed.

A further object is to prevent such read through by a method of manufacture of an air bag cover tear seam including the steps of providing a laser pulse sequence that is coordinated with a part feed speed that will result in a uniformly spaced and controlled depth hole pattern to provide a partially perforated hole pattern that will not read through to the visible surface of the part while defining a weakened seam that will retain the same tear characteristics of either a V-type laser formed groove defining a weakened seam or of through formed laser micro holes of the type disclosed in the '914 patent.

These and other objects, advantages and features of the invention will become more apparent from the following description and accompanying drawings wherein:

BRIEF DESCRIPTION OF THE DRAWINGS

FIG. 1 is a perspective view of a motor vehicle instrument panel incorporating an air bag cover with a partial perforated invisible tear seam according to the present invention;

FIG. 2 is a view taken along the line 2—2 in FIG. 1 when looking in the direction of the arrows;

FIG. 3 is an enlarged view of a portion of the instrument panel taken along the line 3—3 in FIG. 1 when looking in the direction of the arrows;

FIG. 4A is an enlarged bottom view of a portion of the instrument panel taken along the line 4A—4A in FIG. 3 looking in the direction of the arrows;

FIG. 4B is a sectional view taken along the line 4B—4B in FIG. 4A when looking in the direction of the arrows and wherein one embodiment of the holes (i.e. tapered round holes) forming the tear seam are shown greatly exaggerated in size;

FIG. 4C is a vertical sectional view along line 4C—4C of FIG. 4B.

FIG. 5 is a view of the instrument panel in FIG. 1 showing the air bag being deployed though an opening created in the panel on tearing of the tear seam in the skin; and FIG. 6 is a diagrammatic view of apparatus for forming the tear seam according to the present invention.

DETAILED DESCRIPTION OF THE DRAWINGS

Referring to FIGS. 1 and 2, there is illustrated a motor vehicle instrument panel 10 that is located ahead of a windshield 11 and wherein a portion of the panel on the passenger side forms a cover 12 that normally covers and hides an air bag system 14. The air bag system is of a conventional type having an inflatable air bag 16 for protecting a front seat passenger seated in a passenger space 18. The air bag 16 is inflated by a gas generator 20 upon ignition in response to a signal from a controller 22 including a collision sensing device 24 as is well known in the art. The instrument panel 10 including the air bag cover 12 is a laminated structure comprising a thin soft elastic plastic shell or skin 26, an intermediate soft plastic foam layer 28, and a rigid plastic retainer or substrate 30 with the latter providing stiffening support in the panel and means for securing the panel in place on the vehicle body structure. If desired, the foam layer 28 can be omitted.

The skin 26 has a mold produced non-glaring grained outer surface 31 and a uniform thickness in the range of 0.038 to 0.052 inches, and preferably about 0.040 inches at least in the air bag covering area and may be formed of a suitable thermoplastic material such as vinyl, thermoplastic olefin (TPO), thermoplastic polyurethane (TPU) and polyvinyl chloride (PVC). The skin may also be formed of a suitable thermosetting plastic material such as spray urethane. The substrate 30 may be formed of a suitable thermoplastic material such as polycarbonate and acrylonitrile-butadiene-styrene(ABS). The foam layer 28 is bonded to the skin and the retainer and may for example be polyurethane (PU) foam. All of the above materials may be processed to form the respective panel components in a conventional manner that is well known by those skilled in the art.

For creating an opening in the air bag cover 12 for deployment of the air bag, the skin 26 is provided with a partially perforated H-shaped tear seam 32 on the inside thereof (shown as a dotted line in FIG. 1) that, as will be discussed, will not read through to the outside of the skin or shell 26 but will nevertheless retain desired separation characteristics when the air bag is deployed through the air bag cover 12.

The air bag cover 12 includes a substrate 30 that can be provided with a pair of doors 34A and 34B of plastic or metal that are attached with hinges 36A and 36B, respectively, to the retainer as shown in FIGS. 2 and 3. The hinges are shown diagrammatically and can be formed in a wide variety of ways as is well known to those skilled in the art including but not limited to separate hinge members; flexible straps; weakened sections in the substrate about which the hinge doors can bend and the like.

The hinged doors 34a and 34b are arranged so as to be impacted by the inflating air bag 16 and press outward against the foam layer 28 (if present) and the skin 26 to tear away counterpart portions 28a and 28b of the foam layer while also tearing the tear seam 32 as illustrated in FIG. 5. The doors 34a and 34b then swing outward with the torn foam layer portions 28a and 28b (if present), respectively, and counterpart torn portions 26a and 26b, respectively, of the skin to form an opening 38 in the cover for deployment of the air bag into a protective position in the passenger space of the vehicle on the passenger side.

The tear seam 32 is formed in the skin 26 to a prescribed tear seam pattern (H-shape in the embodiment shown) by partially perforated holes 40 that extend partially through the skin as shown in FIGS. 3 and 4A–4C (the size of the tear seam defining holes being shown greatly exaggerated in these views because of their extremely small size). The partially perforated holes may be formed in various shapes and arrays by laser machining as, for example, set forth in U.S. Pat. No. 5,632,914 owned by the assignee of the present invention and incorporated herein by reference. For example, the holes 40 forming the tear seam 32 are round holes as shown in the highly magnified view in FIG. 4A.

In accordance with the invention, the holes 40 are formed to an equal depth and are formed to be equally spaced such that the outer thickness 26c of the skin 26 that overlies each of the holes 40 is of a sufficient thickness to mask the underlying holes such that there will be no read through problems. Accordingly, the weakened seam defined by the partially perforated holes remains a hidden seam that is not discernable to a passenger. Thence, the cover 12 fully hides the underlying air bag deployment system.

Limiting the size of the partial perforations or holes in the skin to a diameter T of 0.035 inches; a uniform spacing S of 0.030 inches and a depth D of 0.020 inches with an overlying shell thickness $T_0$ of 0.018–0.032 inches as measured from the outer side 31 of the skin to the base 40b of the tapered holes 40 is well within the machining capability of an $CO_2$ laser and has been found to produce a tear seam that will readily separate without read through since the precision formation thereof will provide just enough material removal without causing tear seam read through due to the inaccurate removal of material causing too much weakening (to produce read through).

In the case of the precision partial perforations defined by the tapered holes of the present invention, the dimensional limits relate to the throat diameter, depth and spacing of the holes. In the case of the oval slots and elliptically shaped holes, these dimensional limits relate to the largest dimension there across and in the case of the square holes these dimensions relates to that between diagonally opposite corners thereof and in the case of the diamond shaped holes, the dimension relates to that between the farthest spaced points of the diamond shape.

The holes are arrayed along the tear seam pattern and provided in a size of about 0.035 inches or less maximum hole size dimension at the throat entrance of each hole, as shown in FIG. 4B. The holes 40 are formed with a circular entrance 40c and taper to a rounded closed end 40b. The average diameter between entrance 40b and closed end 40c is 0.022 inches. The holes 40 are spaced 0.030 inches on center and are separated by thin wall segments 40d to form a partial perforation pattern. The quantity of holes and resulting spacing or density reduces the cross-section of the skin and thereby the tensile strength thereof along and across the tear seam by no more than about 50 percent. A tear seam of such shape and partial perforations in the thermoplastic or thermosetting material forming the skin assuredly tears or shears therealong from the typical force of air bag inflation but the structural integrity of the skin is sufficiently maintained to resist, for example, premature tearing of the tear seam by the inward pushing by a passenger in the air bag cover area that can incur in normal usage. And it will be understood that the tear seam thus formed by the holes is referred to herein as being invisible because the holes do not penetrate the skin and do not read through because of variations in the thickness of the overlying skin material since each hole 40 is precisely formed in depth as a partial perforation.

The holes 40 forming the tear seam are laser machined from the backside 41 of the skin prior to the formation of the foam layer thereagainst (if present) or after the foam layer is in place. The holes are inherently formed by the laser with a taper that converges in the direction of machining and by machining from the backside, the holes are made smallest at a point underlying the skin material at 26 and can thereby be made as small as possible at this point within the capability of the laser. For example, when the round holes 40 are laser machined from the backside as shown in FIGS. 3 and 4C, the holes may taper from a diameter of about 0.035 inches at the backside 41 to a diameter of about 0.0005 inches underlying the skin layer 26a at the outer surface 31 when the skin is 0.038–0.052 inches thick If the foam layer is applied after formation of the holes, the holes may or may not be filled with foam. If filled with foam, it may be desirable to laser machine partial hole perforations after formation of the foam layer in which case, the pattern of holes in the foam layer will substantially duplicate the size, shape and spacing of the holes in the skin or shell.

Referring to FIG. 6, there is diagrammatically illustrated a computer controlled laser machining work cell 44 for producing the above described tear seam embodiments. In the work cell, a machining laser 46 is mounted on a robot 48 and is controlled together with the robot by a programmable controller 50. The laser 46 is of the $CO_2$ type and is capable of machining holes between 0.0005 inches diameter and 0.05 inches diameter in thermoplastic and thermosetting materials in a range of shell thickness between 0.001 and 0.160, and in the illustrated embodiment of about 0.040 inches thickness. When shell thickness is used herein, it should be understood that it corresponds to the thickness of the primary skin material in an air bag cover.

To illustrate the laser machining operation, an air bag cover skin 52 like that described above but without the tear seam, foam layer and retainer is firmly held in place with its backside 54 facing upward in a fixture 56 with clamps 58. The laser 46 is then manipulated by the robot 48 under programmed control by the controller 50 to track the desired tear seam pattern along the curvature of the skin at the backside thereof and dwell for a prescribed machining time at the desired hole locations while the controller 50 then also operates the laser with program control to machine the tear seam defining holes during the dwell times to thus form the desired Tear seam pattern. Where the holes being machined are tapered holes, the laser's pulse rate is synchronized with the feed rate to produce the same number of laser pulses at each hole to assure precise hole depth.

A suitable $CO_2$ laser for machining the tear seam defining miniature holes described above is available from Convergent Energy (Sturbridge, Mass.). The robot is preferably a 5 or 6-axis robot. The fixture 56 is preferably mounted on a single axis shuttle table. The controller for the laser and the robot is also of a suitable conventional type and the programming of the controller to operate the robot and laser is well within the skill in the art given the above specifications for the holes, the contour of the particular skin and the desired tear seam pattern. And since the tear seam patterns can be readily changed by the programming of the controller, there is provided a very cost effective flexible manufacturing method wherein different tear seam patterns for different or identical ms can be machined in the same work cell by simply calling up the individual program therefor.

The method of the present invention, to produce such an array includes using a $CO_2$ laser with an average output power of 10–75 watts and a lens with a focal length of ten inches; the scoring robot is programmed to achieve a consistent speed of 50 mm/sec at this distance, while remaining as square to the scoring surface as possible. The hole values discussed herein are achieved by setting the laser at a pulse period of 4000 to 8000 microseconds and a pulse width of 400 to 1000 microseconds. The above parameters are used to achieve approximately 25–50 holes per lineal inch; and more particularly 32–39 holes per lineal inch along straight lines for TPU. Above 40 holes per inch read though begins to develop forth in the TPU and below 30 holes per inch the skin is not adequately weakened. The number of holes per inch is increased approximately 25% in corner regions where read through is generally less detectable. 4) These values, of course, will vary depending upon the type of material being processed and its dimensions.

Another feature of the invention is that the aforesaid programming of the computer feed system will assure that each hole location will receive the same number of laser pulses on-the-fly so that the depth of each hole will be precisely formed at substantially the same depth thereby to assure that the holes are not formed too close to the surface as can be the case with a v groove type continuously formed weakened seam.

The invention has been described in an illustrative manner with respect to presently preferred embodiments, and it is to be understood that the terminology that has been used is intended to be in the nature of words of description rather than words of limitation. Obviously, many modifications and variations of the present invention in light of the above teachings may be made. For example, a similar or different form of air bag cover having a skin with a suitable tear seam pattern made according to the invention could also be used to cover an air bag unit mounted at some other suitable location in the front or rear of the passenger compartment. For further example, an H-shaped tear seam pattern has been chosen to illustrate the invention but other tear seam patterns such as those with a C, U and X shape may be similarly formed in accordance with the above tear seam hole teachings and with a suitable door or doors provided in the substrate. It is therefore to be understood that within the scope of the appended claims, the invention may be practiced otherwise than as specifically shown and described.

What is claimed is:

1. An air bag cover having an outer skin with a hidden tear seam characterized by a series of partial perforations in the inside of the skin having a hole size in the range of 0.020 to 0.035 inches and arranged on center at a range of 0.005 to 0.045 inches.

2. The air bag cover of claim 1 having a tear seam formed with laser machined holes in the inside of the skin that have a precise depth at each hole to define an easily separable weakened seam in an air bag cover while remaining invisible when viewed at and within a normal viewing distance in the vehicle without penetrating or reading through the outer side or outside surface of the cover.

3. The air bag cover of claim 2 wherein each hole has a bottom surface arranged closely adjacent the outer side of the skin but at a controlled depth that will prevent read through of the holes at the outer side of the skin.

4. The air bag cover of claim 2 having a hidden tear seam with partially perforated laser machined holes formed according to a tear seam pattern established by placement of the holes adjacent one another.

5. The air bag cover of claim 1 wherein each hole is formed by laser machining an array or matrix of partially perforated spaced miniature holes by the same number of laser pulses at each hole while the skin is moved on-the-fly relative to the laser unit.

6. The air bag of claim 1 wherein the hole pattern on the inner or backside surface of a skin or shell is selected to assure against mechanical weakening of the skin or shell that might cause read through in the skin or shell.

7. The air bag cover of claim 1 providing a skin or shell covering in an air bag cover assembly that has a hidden seam therein formed by a pattern of round entrance, tapered holes that are uniformly spaced and formed to a uniform depth in only the underside or inside surface of the skin and wherein the uniform spacing and the depth of the round holes is selected to prevent read through while retaining desired programmed release of the cover when an air bag is deployed.

8. An air bag cover having an outer skin surface and an inner skin surface supported by a thickness; said inner skin surface characterized by a series of partial perforations extending into said thickness toward said outer skin surface; substantially all said partial perforations having a bottom surface no less than 0.018" from said outer skin surface and a distance center to center creating substantially no overlap between said perforations.

9. A method for making a hidden tear seam in an air bag cover comprising the steps of providing a laser pulse sequence that is coordinated with a part feed speed on-the-fly to form uniformly spaced and controlled depth tapered hole patterns that will not read through to the visible surface of the cover.

10. The method of claim 9 further comprising the steps of:
prescribing a tear seam pattern for the skin; and laser machining an array of partial perforations in the backside of the skin in the prescribed tear seam pattern having a maximum hole size dimension at the backside side of the skin that does not exceed about 0.035 inches and that terminates at point 0.018–0.032 inches below the outside of the skin at a tapered hole that has an average size from the outside diameter to the termination point in the range of 0.022 to 0.030 inches and with spacing therebetween that reduces the tensile strength of the skin along the tear seam pattern by not more than about 50 percent to thereby form an invisible tear seam in the skin.

11. The method of claim 9 further comprising pulsing the laser at a pulse period of 4000 to 8000 microseconds and at a pulse width of 400 to 1000 microseconds while coordinating the relative feed speed of the skin to cause the same number of pulses at each hole formation.

12. The method of claim 9 further comprising the step of forming the skin of a thermoplastic material.

13. The method of claim 9 further comprising the step of forming the skin of a thermosetting plastic material.

14. The method of claim 9 further comprising the step of forming the holes with a round shape in cross-section.

15. The method of claim 9 further comprising the step of forming the holes with an oval shape.

16. The method of claim 9 further comprising the step of forming the holes with an elliptical shape.

17. The method of claim 9 further comprising the step of forming the holes with a square shape having corners arranged on a line in the tear seam pattern.

18. The method of claim 9 further comprising the step of forming the holes with a diamond shape having points arranged in arranged in a line in the tear seam pattern.

19. The method of claim 10 further comprising the step of forming the skin of a thermoplastic material.

20. The method of claim 10 further comprising the step of forming the skin of a thermosetting plastic material.

21. The method of claim 10 further comprising the step of forming the holes with a round shape in cross-section.

22. The method of claim 11 further comprising the step of forming the skin of a thermoplastic material.

23. The method of claim 11 further comprising the step of forming the skin of a thermosetting plastic material.

24. The method of claim 11 further comprising the step of forming the holes with a round shape in cross-section.

* * * * *